March 21, 1961

A. HAKIMOGLU 2,976,496

PULSE WIDTH MODULATOR

Filed April 24, 1959

INVENTOR.
AYHAN HAKIMOGLU
BY Edward M. Farrell
ATTORNEY

March 21, 1961  A. HAKIMOGLU  2,976,496
PULSE WIDTH MODULATOR
Filed April 24, 1959  3 Sheets-Sheet 2

INVENTOR.
AYHAN HAKIMOGLU
BY Edward M. Farrell
ATTORNEY

United States Patent Office 2,976,496
Patented Mar. 21, 1961

2,976,496
PULSE WIDTH MODULATOR

Ayhan Hakimoglu, Levittown, N.J., assignor, by mesne assignments, to American Bosch Arma Corporation, Hempstead, N.Y., a corporation of New York Filed Apr. 24, 1959, Ser. No. 808,725

12 Claims. (Cl. 332—1)

This invention relates to circuits for translating pulse amplitude signals into corresponding pulse width signals, and more particularly to such circuits utilizing solid state devices.

In many telemetering and other systems utilizing pulse width modulators, information signals from transducers or pickups generally vary in amplitude in accordance with variable functions measured. The output information signals from the pickups may, for example, vary between zero and five volts. For various reasons, it is desirable to frequency modulate a low frequency oscillator or transmitter by a signal in which the amplitude remains relatively constant and the width varies in accordance with the information signal measured. In these cases, the original variable amplitude signals from the pickups are converted into corresponding variable width signals, with the variable width signals then being used to modulate the sub-carrier oscillator or transmitter.

In many standard telemetering systems a limited operating band width is available. For this reason, time division multiplexing is employed to permit a maximum amount of information to be transmitted. Consequently, the transmitted information signals are in the form of pulses.

Many of the pulse converter circuits used heretofore have involved relatively complicated circuitry including various types of multivibrators. The use of such circuits has generally resulted in a relatively complex system which have often added considerably to the size and weight of units involved in air-borne telemetering systems.

In recent years, the use of solid state or transistor devices have been greatly increased due to their small size and power requirements. Such devices, however, often present problems when subjected to temperature variations and other environmental changes.

It is an object of this invention to provide an improved signal converter circuit.

It is a further object of this invention to provide an improved signal converter circuit in which pulse amplitude signals are converted into corresponding pulse width signals.

It is still a further object of this invention to provide an improved circuit for translating pulse amplitude signals into corresponding pulse width signals utilizing a relatively simple circuit.

It is still a further object of this invention to provide an improved signal converter circuit which makes maximum use of transistor devices without the attendant problems relating to temperature and other variable conditions.

In accordance with the present invention, a circuit for converting pulse amplitude modulated signals into corresponding pulse width modulated signals is provided. A charging circuit is triggered to become charged at the beginning of each pulse amplitude signal. The pulse amplitude signal is applied to a comparison circuit. The charging circuit is designed to discharge at a constant linear rate. A variable pulse width signal is developed which is a function of the amplitude of the pulse amplitude signal. The variable width signal may then be applied to a modulation or other utilization circuit.

Other objects and advantages of the present invention will be apparent and suggest themselves to those skilled in the art to which the present invention is related, from a reading of the following specification and claims, in which:

Figure 1:
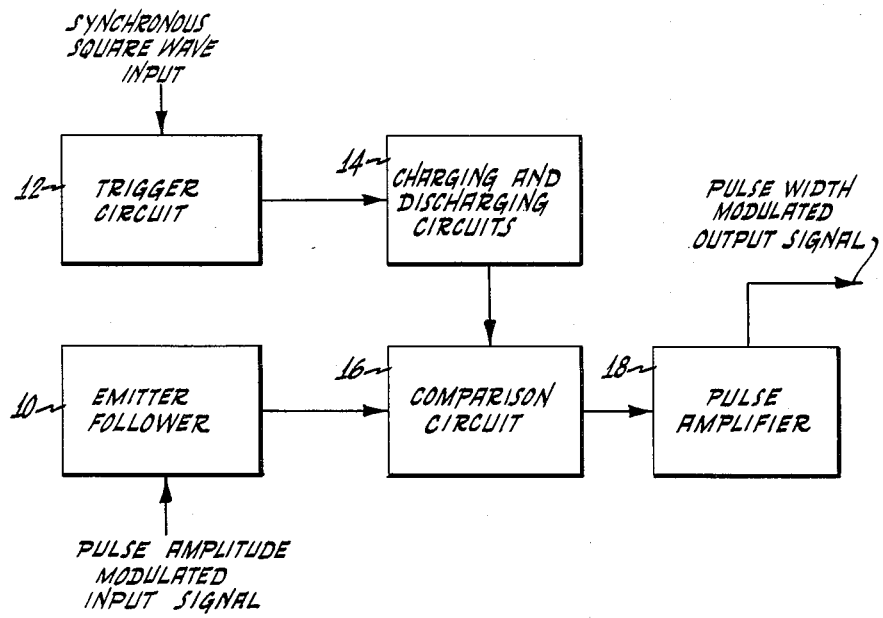
Figure 1 is a block diagram illustrating a signal converter circuit, in accordance with the present invention.

Referring particularly to Figure 1, pulse amplitude modulated signals are applied to an emitter follower circuit 10. The emitter follower circuit 10 provides the proper level of input impedance for the pulse amplitude input signals.

A synchronous or clock input signal, which may be in the form of a series of square waves, is applied to a trigger circuit 12. A trigger pulse or spike signal is produced at the start or during each square wave or synchronous signal period. The trigger pulse produced is applied from the trigger circuit 12 to a charging and discharging circuit 14. The charging and discharging circuit 14 is charged with a very small time constant by the trigger pulse from the trigger circuit 12.

The output signals from the emitter follower 10, representing the pulse amplitude modulated information signals, and the signals developed by the charging and discharging circuit 14 are applied to a comparison circuit 16. Pulse width signals are developed in the output circuit of the comparison circuit 16. The pulse durations of the output pulses are determined by the time it takes the charging and discharging circuit 14 to discharge to the levels of the pulse amplitude modulated signals from the emitter follower 10. Consequently, the output signals from the comparison circuit 16 will vary in width in accordance with the amplitude of the input signals applied to the emitter follower 10.

The output signal from the comparison circuit 16 is applied to a pulse amplifier 18. The pulse amplifier may be employed as a limiter to limit the amplitude of the input signals to produce signals of substantially the same amplitude. The output signals from the pulse amplifier 18, which may be of constant amplitude and variable widths, may then be used to modulate a sub-carrier oscillator, the carrier signal of a transmitter or may be applied to some other utilization circuit.

Figure 2:
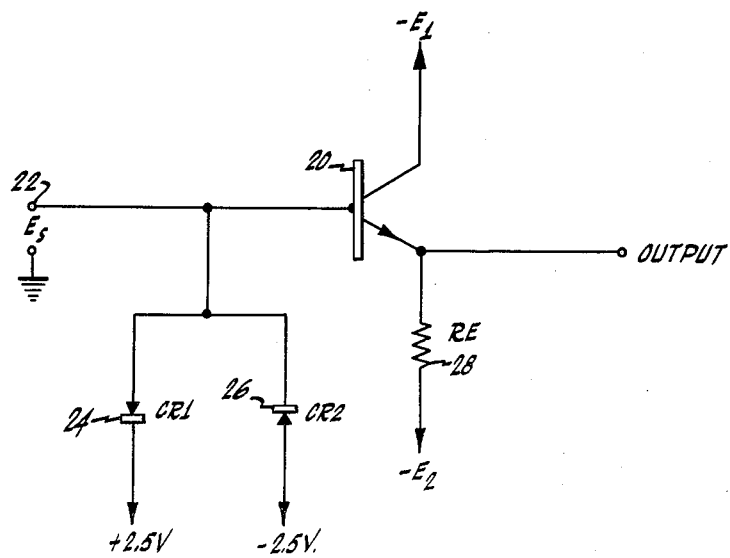
Figures 2 to 6 are schematic diagrams of circuits which may be included in the arrangement illustrated by the block diagram in Figure 1.

Referring particularly to Figure 2, the emitter follower 10, illustrated in Figure 1, includes a transistor 20. An emitter follower circuit is often desirable to provide a high input impedance for the sampled sources of information signals. Pulse amplitude modulated signals are applied between a terminal 22 and ground to the base of the transistor 20. These signals may be in the form of a train of information pulses from a commutator sequentially sampling a plurality of information sources. A pair of diodes 24 and 26 are provided in the input circuit of the transistor 20 to clamp the input signal if it exceeds plus or minus 2.5 volts, for example. This may be a desirable feature in some telemetering systems. The output signal from the emitter of the transistor 20, developed across a resistor 28, is applied to the comparison circuit 16 (Figure 1).

Figure 3:
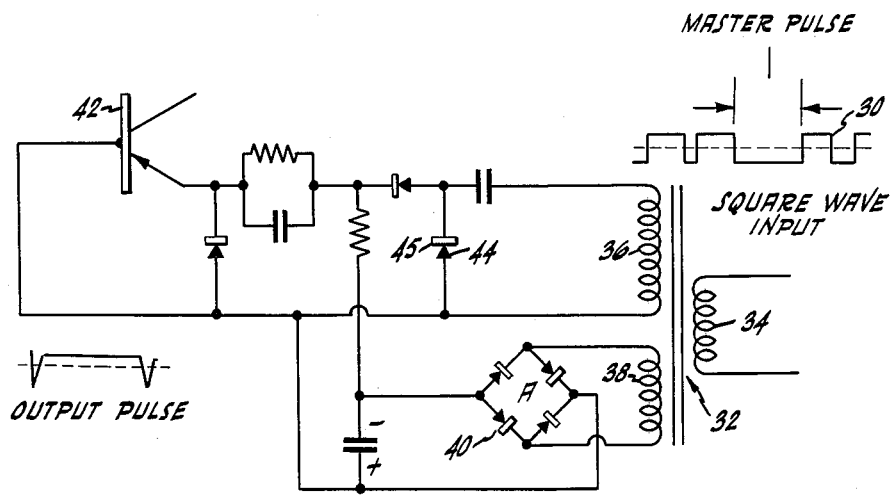

Referring particularly to Figure 3, a circuit for developing a trigger pulse as well as a bias potential is illustrated. In the embodiment illustrated, an external source, which may be a commutator device or circuit, provides synchronizing signals 30. These signals, which may be square waves, are applied to a transformer 32, which includes a primary winding 34 and a pair of secondary windings 36 and 38.

A full-wave rectifier circuit 40, associated with the secondary winding 38, is provided to produce a bias voltage for maintaining a transistor 42 in a cut-off condition for the duration of a pulse period after the initial triggering. A half-wave rectifier circuit 44 is utilized to produce a trigger signal for triggering a transistor 42 for charging the charging circuit, as will be described more fully. It is noted that a trigger pulse is developed only at the start of each square wave signal. When the square wave is going in the negative direction, the trigger developed at the secondary winding 36 is by-passed by a diode 45 and consequently does not affect the operation of the transistor 42.

Figure 4:
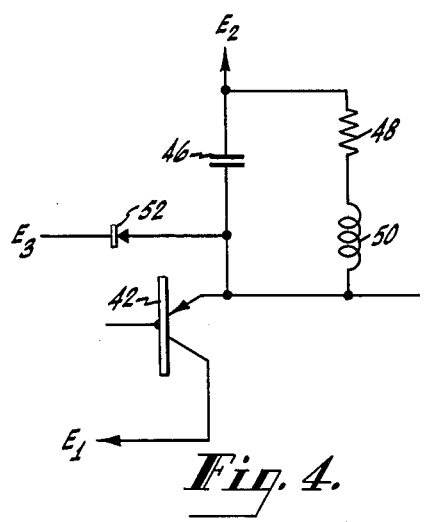

Referring particularly to Figure 4, charging circuit includes a capacitor 46 shunted by a resistor 48 and an inductor 50. At the start of each information pulse, a trigger pulse is applied to the collector of the transistor 42. This causes the capacitor 46 to become charged through the transistor 42 to a voltage designated as $E_1$. The charging of the capacitor 46 takes place with a very small time constant, determined to some extent by the transistor used. After the capacitor 46 is charged to $E_1$, the base of the transistor 42 becomes positive with respect to its emitter. The transistor 42 therefore becomes and remains at cut-off until another trigger pulse is applied to its emitter. After the transistor 42 has been cut-off, the capacitor 46 starts to discharge linearly toward a fixed direct current voltage, designated $E_2$, through the inductor 50 and the resistor 48. Because the diode 52 will start to conduct when the voltage at the emitter of the transistor 42 reaches a voltage, designated $E_3$, the voltage at the emitter is clamped at this point.

In practicing the present invention, it has been found experimentally that the best linear discharge can be obtained when the product of L and C (in farads) is approximately $.5 \times 10^{-6}$ at $E_1 - E_3 = \frac{1}{3}(E_1 - E_2)$. A linear discharge is particularly important in signal converter circuits. It is known that transistors are often subject to drifts from temperature and other changes and generally may not be used in many circuits where linearity is of prime importance, unless complicated compensation networks are employed. While utilizing the numerous advantages of transistors, i.e. small size and minimum power consumption, the present invention makes use of conventional elements in its charging and discharging circuit to achieve good linearity.

Figure 5:
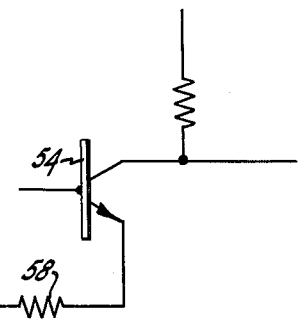

Referring particularly to Figure 5, a comparison circuit includes a transistor 54, which is a normally conducting. When the capacitor 46 (Figure 4) of the discharging circuit is charged rapidly, as when triggered, the transistor 54 is biased to cut-off and remains cut-off until the voltage across the capacitor 46 reaches the value of the emitter follower output voltage. The output voltage of the emitter follower 20 (Figure 2) is applied to the emitter of the transistor 54 through a diode 56 and a resistor 58. The voltage from the linear discharge circuit (Figure 4) is applied to the base of the transistor 54. The output of the modulator circuit is developed for the duration of the period that the transistor 54 is cut-off. This period is equal to the time that it takes the discharging circuit voltage, applied to the base of the transistor 54, to reach the voltage from the emitter follower, applied to the emitter of the transistor 54.

Figure 6:
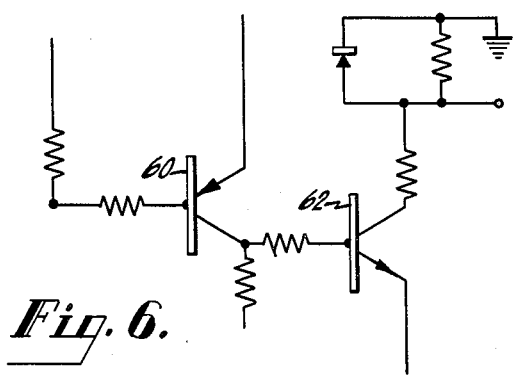

Referring particularly to Figure 6, amplifier circuits include a pair of transistors 60 and 62. Both transistors are at cut-off during the development of an output pulse and at saturation during a no output pulse. The bases of the transistors 60 and 62 are biased to keep them non-conducting during the information period.

Figure 7:
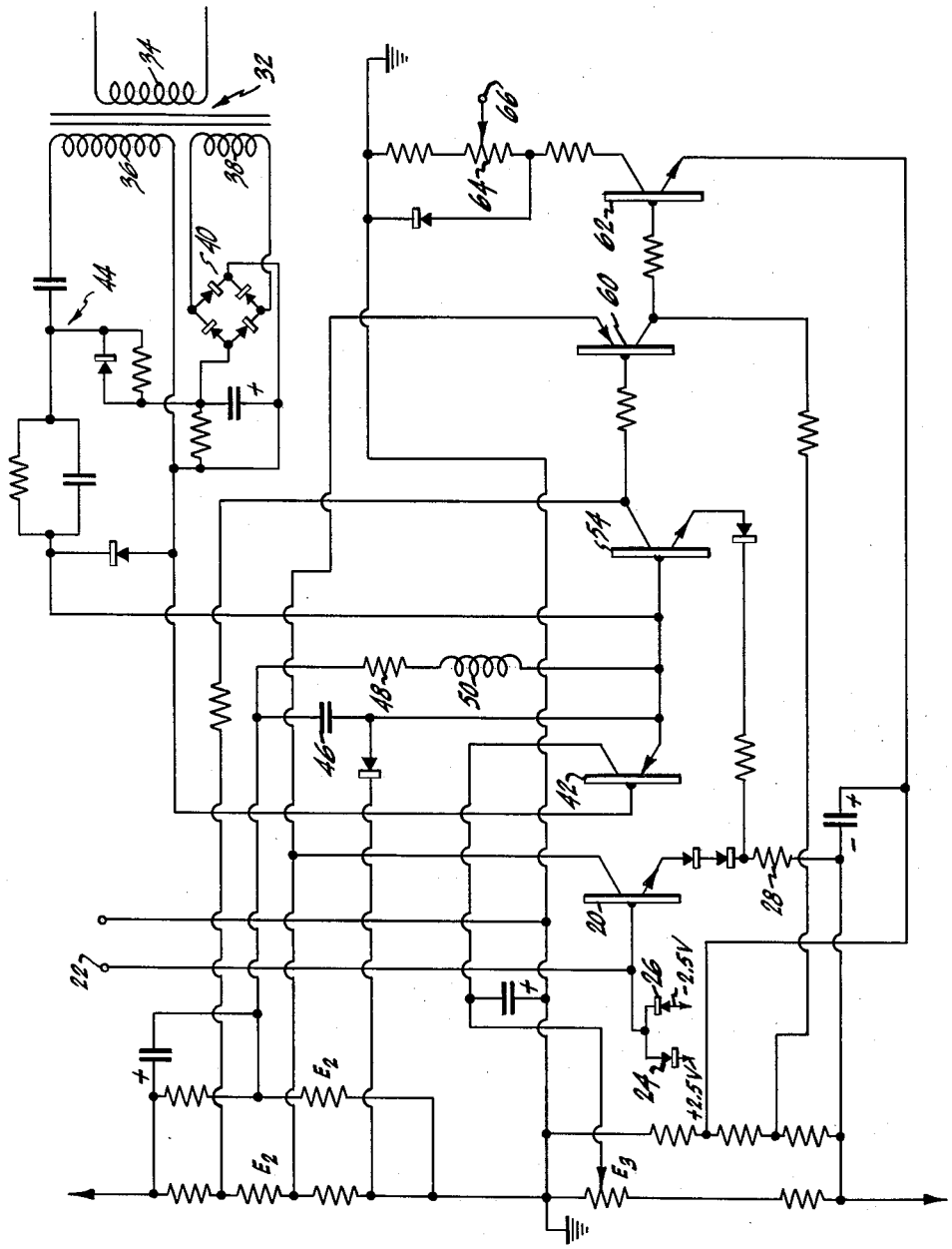
Figure 7 is a composite schematic diagram of the circuits illustrated in Figures 2 to 6.

Referring particularly to Figure 7, a complete circuit which includes all the circuits of Figures 2 to 6 is illustrated. The basic operation of the circuit is similar to that previously described. Various minor circuit elements have been included to provide a complete working circuit, which has been built and proven satisfactory.

A pulse amplitude modulated signal is applied across the terminal 22 and ground to the transistor 20. The transistor 20 includes an emitter follower circuit with the output signal developed across the resistor 28 being applied to the transistor 54 through the diode 56 and the resistor 58.

At the start of each pulse amplitude modulated signal a trigger volt is applied from the half-wave rectifier 44 to the base of the transistor 42. The charging circuit, including the capacitor 46, resistor 48 and inductor 50, becomes charged in a very short time interval, with the transistor 42 becoming cut-off. A bias potential is provided from the full-wave rectifier 40 to maintain the transistor 42 at cut-off. Under these conditions the capacitor 46 starts to discharge.

During the discharge period of the capacitor 46, the pulse width signals corresponding to the applied pulse amplitude signal is developed. During this time the amplifiers including the transistors 60 and 62 are at cut-off. The output signal from the transistor 42 applies from a variable resistor 64 to an output terminal 66.

When the voltage at the base of the transistor 54, representing the discharging voltage of the capacitor 46, reaches the voltage of the emitter of the transistor 54, representing the amplitude modulated signal from the emitter follower circuit, the pulse width measuring period is over and the transistor 54 starts to conduct. At the same time transistors 60 and 62 start to conduct.

Thus it is seen that the signal at the terminal 66 will vary in width in accordance with the amplitude of the pulse signal applied to the input terminal 22.

The present invention has provided a signal converter circuit without the use of complicated multivibrator circuits. The use of such a simplified circuit makes it possible to provide a converter circuit of minimum size and space and maximum reliability.

It is noted that the pulse width signal depends upon capacitor 46 and not upon the characteristics of the transistors employed. Consequently, the pulse width signal developed is not subject to temperature drifts as a result of changes in the characteristics of the transistors employed. This permits a greater linear signal to be developed.

It has therefore been seen that a relatively simple pulse converter circuit has been provided which includes a linearly discharging circuit. The rate of discharge is substantially the same for all levels of input signals of different amplitudes. The rate of discharge is determined by two sources of voltages of predetermined values connected across the charging circuit. The two voltages include the voltage to which the charging circuit is triggered and the voltage towards which the charging circuit discharges. When the charging circuit is discharged to a predetermined level relative to the amplitude of the input signal, a transistor is made conductive to end the period of pulse development in its output circuit.

What is claimed is:

1. A pulse concerter circuit for converting a pulse amplitude modulated signal into a corresponding pulse width modulated signal comprising a charging circuit, means for charging said circuit to a predetermined voltage, means for linearly discharging said charging circuit, a comparison circuit including an output circuit, means for applying the output voltage from said charging circuit and said pulse amplitude modulated signal to said comparison circuit, said comparison circuit developing a pulse during the time that the voltage from said charging circuit discharges to a predetermined voltage level relative to said pulse amplitude modulated signal.

2. A circuit for converting a pulse amplitude modulated signal into a corresponding pulse width modulated signal comprising a charging circuit, means for charging said circuit to a predetermined voltage, means for linearly discharging said charging circuit, a comparison circuit including a transistor having an output circuit for developing a pulse signal during the cut off period of said transistor, means for maintaining said transistor in a cut off condition, means for applying the output voltage from said charging circuit and said pulse amplitude modulated signal to said comparison circuit, said transistor becoming conductive when said charging circuit discharges to a predetermined voltage level relative to the level of said pulse amplitude modulated signal whereby a pulse width modulated signal corresponding to said pulse amplitude modulated signal is developed in the output circuit of said comparison circuit.

3. A circuit for converting a series of pulse amplitude modulated signals into corresponding pulse width modulated signals comprising a charging circuit, means for charging said circuit to a predetermined voltage for each pulse amplitude modulated signal, means for linearly discharging said charging circuit, a comparison circuit including a transistor having an output circuit for developing a pulse signal during the cut off period of said transistor, means for maintaining said transistor in a cut off condition, means for applying the output voltage from said charging circuit and said pulse amplitude modulated signals to said comparison circuit, said transistor becoming conductive each time said charging circuit discharges to a predetermined voltage level relative to the level of said pulse amplitude modulated signals whereby pulse width modulated signals corresponding to said pulse amplitude modulated signals are developed in the output circuit of said comparison circuit.

4. A pulse converter for converting a series of pulse amplitude modulated signals into corresponding pulse width modulated signals comprising a charging circuit including an inductive element, means for charging said charging circuit to a predetermined voltage for each pulse amplitude modulated signal, means for linearly discharging said charging circuit through said inductive element, a comparison circuit including a transistor having an output circuit for developing a pulse signal during the cut off period of said transistor, biasing means for maintaining said transistor in a cut off condition, means for applying the output voltage from said charging circuit and said pulse amplitude modulated signals to said transistor, said transistor becoming conductive each time said charging circuit discharges to a predetermined voltage level relative to the level of said pulse amplitude modulated signals whereby pulse width modulated signals corresponding to said pulse amplitude modulated signals are developed in the output circuit of said circuit.

5. A pulse converter for converting a series of pulse amplitude modulated signals into corresponding pulse width modulated signals comprising a charging circuit including an inductive element, a trigger circuit for developing trigger signals at the start of each of said pulse amplitude modulated signals, means for applying said trigger signals to charge said charging circuit to a predetermined voltage for each trigger signal, means for linearly discharging said charging circuit through said inductive element, a comparison circuit including a transistor having an output circuit for developing a pulse signal during the cut off period of said transistor, biasing means for maintaining said transistor in a cut off condition, means for applying the output voltage from said charging circuit and said pulse amplitude modulated signals to said transistor, said transistor becoming conductive each time said charging circuit discharges to a predetermined voltage level relative to the level of said pulse amplitude modulated signals whereby pulse width modulated signals corresponding to said pulse amplitude modulated signals are developed in the output circuit of said comparison circuit.

6. The invention as set forth in claim 5 wherein a synchronous signal in the form of a series of square waves is applied to said trigger circuit to develop said trigger signals.

7. The invention as set forth in claim 6 wherein a rectifier is employed to rectify said square waves to provide said biasing means for said transistor.

8. A circuit for converting pulse amplitude modulated signals into corresponding pulse width modulated signals comprising a charging circuit, means for producing a predetermined potential across said charging circuit for each pulse amplitude modulated signal, means for discharging said charging circuit linearly from said predetermined potential to a second predetermined potential, and means for producing a pulse width signal until said discharging circuit voltage discharges to a predetermined level with respect to the levels of said pulse amplitude modulated signals.

9. A circuit for converting a pulse amplitude modulated signal into a corresponding pulse width modulated signal comprising a charging circuit, means for developing a trigger pulse during the time interval of said pulse amplitude modulated signal, means for applying said trigger pulse to charge said charging circuit to a predetermined voltage during a relatively short time constant interval, a comparison circuit, means for applying said pulse amplitude modulated signal and the output voltage from said charging circuit to said comparison circuit, and means for linearly discharging said charging circuit from said predetermined voltage to a second predetermined voltage, and means for developing a pulse width signal in the output circuit of said comparison circuit until the voltage of said charging circuit discharges to a level representative of the level of said pulse amplitude signal.

10. A circuit for converting a series of pulse amplitude modulated signals into a series of corresponding pulse width modulated signals comprising a transistor, an output circuit for developing a signal during the cut off period of said transistor, a linear charging circuit including an inductive element for developing a predetermined voltage sufficient to cut off said transistor, means for triggering said charging circuit to charge to said predetermined voltage during each pulse amplitude modulated signal, means for applying said predetermined voltage to cut off said transistor to develop a signal in said output circuit, means for applying said pulse amplitude modulated signals to said transistor, means for linearly discharging said charging circuit through said inductive element from said predetermined voltage to a second predetermined voltage level, said transistor becoming conductive when the voltage at said charging circuit reaches the representative value of said amplitude modulated signals whereby pulse width modulated signals corresponding to said pulse amplitude signals are developed in said output circuit of said transistor.

11. The invention as set forth in claim 5 wherein a synchronous signal in the form of a series of square waves is applied to said trigger circuit to develop said trigger signal.

12. The invention as set forth in claim 6 wherein a rectifier is employed to rectify said square waves to provide said biasing means for said transistor.

References Cited in the file of this patent

UNITED STATES PATENTS

| | | |
|---|---|---|
| 2,822,522 | Price | Feb. 4, 1958 |
| 2,824,287 | Green et al. | Feb. 18, 1958 |